(12) United States Patent
Hensarling et al.

(10) Patent No.: US 11,053,793 B2
(45) Date of Patent: Jul. 6, 2021

(54) SINGLE LAYER ANTENNA PATH PROFILE

(71) Applicant: Halliburton Energy Services, Inc., Houston, TX (US)

(72) Inventors: Jesse K. Hensarling, Cleveland, TX (US); Brian Mohon, Houston, TX (US); Alexei Korovin, Houston, TX (US); Imran Sharif Vehra, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 14 days.

(21) Appl. No.: 16/346,065

(22) PCT Filed: Nov. 7, 2017

(86) PCT No.: PCT/US2017/060436
§ 371 (c)(1),
(2) Date: Apr. 29, 2019

(87) PCT Pub. No.: WO2018/118255
PCT Pub. Date: Jun. 28, 2018

(65) Prior Publication Data
US 2020/0056476 A1  Feb. 20, 2020

Related U.S. Application Data

(60) Provisional application No. 62/437,741, filed on Dec. 22, 2016.

(51) Int. Cl.
*E21B 47/12* (2012.01)
*G01V 3/28* (2006.01)
(Continued)

(52) U.S. Cl.
CPC ............... *E21B 49/00* (2013.01); *G01V 3/28* (2013.01); *H01Q 1/04* (2013.01); *E21B 47/12* (2013.01)

(58) Field of Classification Search
CPC .................................. E21B 47/12; G01V 3/28
See application file for complete search history.

(56) References Cited

U.S. PATENT DOCUMENTS 2,018,080 A * 10/1935 Martienssen ............ G01V 3/26
324/333
2,184,997 A * 12/1939 Johnson .................... H01Q 1/36
343/725
(Continued)

FOREIGN PATENT DOCUMENTS

JP  2001127521 A  *  5/2001  ............. H01Q 1/362
JP  2004363763 A     6/2006
(Continued)

OTHER PUBLICATIONS

Translation of JP2001127521 (Year: 2001).*
(Continued)

*Primary Examiner* — Giovanna Wright
(74) *Attorney, Agent, or Firm* — Gilliam IP PLLC

(57) ABSTRACT

A single layer antenna path profile is provided. An antenna assembly for the single layer antenna profile includes a bobbin having a cylindrical body defining an outer radial surface, an inner radial surface, and a central axis. The antenna assembly also includes one or more channels defined in the outer radial surface. In some aspects, each channel is defined by a continuously curved inner surface having a constant radius. In some aspects, the inner surface extends more than 180 but less than 360 and thereby defines an opening in the body. The antenna assembly also includes a coil including a wire wrapped about the bobbin and received within the one or more channels. In some aspects, an arcuate portion of the wire extends through the opening such that a portion of the wire protrudes out of the channel.

20 Claims, 4 Drawing Sheets

(51) Int. Cl.
*E21B 49/00* (2006.01)
*H01Q 1/04* (2006.01)

(56) References Cited

U.S. PATENT DOCUMENTS

| | | | |
|---|---|---|---|
| 6,163,155 A * | 12/2000 | Bittar | G01V 3/28 324/338 |
| 2005/0168224 A1* | 8/2005 | Freeman | H01L 27/12 324/338 |
| 2007/0039161 A1* | 2/2007 | Garcia | E21B 43/106 29/507 |
| 2008/0030415 A1 | 2/2008 | Homan et al. | |
| 2009/0309798 A1 | 12/2009 | Bittar et al. | |
| 2010/0244841 A1* | 9/2010 | Wang | E21B 47/01 324/333 |
| 2011/0084699 A1 | 4/2011 | Wisler et al. | |
| 2013/0246561 A1 | 9/2013 | Paramasivam et al. | |
| 2013/0249561 A1 | 9/2013 | Knizhnik | |
| 2014/0292340 A1 | 10/2014 | Yang | |

FOREIGN PATENT DOCUMENTS

| | | |
|---|---|---|
| WO | 2008036077 A2 | 3/2008 |
| WO | 2008036077 A3 | 3/2008 |
| WO | 2016114784 A1 | 7/2016 |

OTHER PUBLICATIONS

EP Application Serial No. 17884760.4, Extended European Search Report, dated Apr. 29, 2020, 6 pages.
Canadian Application Serial No. 3,043,332; Office Action; dated May 1, 2020, 4 pages.
GCC Application Serial No. 2017/34285; First Examination Report; dated Mar. 25, 2019, 4 pages.
PCT Application Serial No. PCT/US2017/060436, International Written Opinion, dated Feb. 8, 2018, 8 pages.
PCT Application Serial No. PCT/US2017/060436, International Search Report, dated Feb. 8, 2018, 4 pages.
GCC Application Serial No. 2017/34285; Second Exam Report; dated Aug. 18, 2019, 4 pages.

\* cited by examiner

SINGLE LAYER ANTENNA PATH PROFILE

TECHNICAL FIELD

The present description relates in general to antenna systems, and more particularly to, for example, without limitation, a single layer antenna path profile.

BACKGROUND

During drilling operations for the extraction of hydrocarbons, a variety of recording and transmission techniques are used to provide or record real-time data from the vicinity of a drill bit. Measurements of surrounding subterranean formations may be made throughout drilling operations using downhole measurement and logging tools, such as measurement-while-drilling (MWD) and/or (LWD) tools, which help characterize the formations and aid in making operational decisions. More particularly, such wellbore logging tools make measurements used to determine the electrical resistivity (or its inverse, conductivity) of the surrounding subterranean formations being penetrated, where the electrical resistivity indicates various geological features of the formations. Resistivity measurements may be taken using one or more antennas coupled to or otherwise associated with the wellbore logging tools.

Logging tool antennas are often formed by positioning coil windings about an axial section of the wellbore logging tool, such as a drill collar. A ferrite material or "ferrites" are sometimes positioned beneath the coil windings to increase the efficiency and/or sensitivity of the antenna. The ferrites facilitate a higher magnetic permeability path (i.e., a flux conduit) for the magnetic field generated by the coil windings, and help shield the coil windings from the drill collar and associated losses (e.g., eddy currents generated on the drill collar).

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

The present disclosure relates generally to wellbore logging tools used in the oil and gas industry and, more particularly, to antenna bobbins used in wellbore logging tools and methods of wrapping coil windings about an antenna bobbin.

Figure 1:
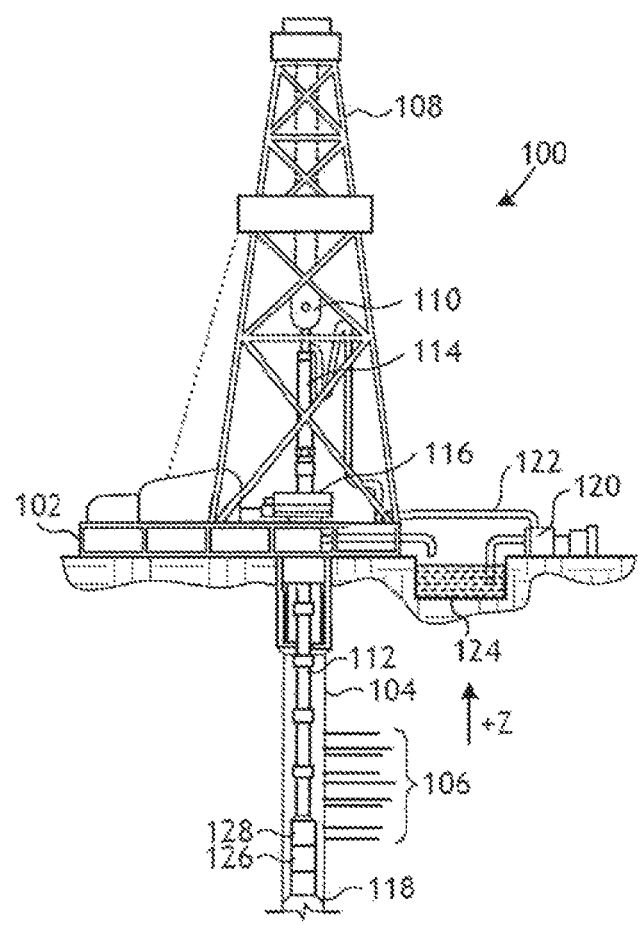
FIG. 1 is a schematic diagram of an example drilling system that may employ the principles of the present disclosure.

FIG. 1 is a schematic diagram of an example drilling system 100 that may employ the principles of the present disclosure, according to one or more embodiments. As illustrated, the drilling system 100 may include a drilling platform 102 positioned at the surface and a wellbore 104 that extends from the drilling platform 102 into one or more subterranean formations 106. In other embodiments, such as in an offshore drilling operation, a volume of water may separate the drilling platform 102 and the wellbore 104.

The drilling system 100 may include a derrick 108 supported by the drilling platform 102 and having a traveling block 110 for raising and lowering a drill string 112. A kelly 114 may support the drill string 112 as it is lowered through a rotary table 116. A drill bit 118 may be coupled to the drill string 112 and driven by a downhole motor and/or by rotation of the drill string 112 by the rotary table 116. As the drill bit 118 rotates, it creates the wellbore 104, which penetrates the subterranean formations 106. A pump 120 may circulate drilling fluid through a feed pipe 122 and the kelly 114, downhole through the interior of drill string 112, through orifices in the drill bit 118, back to the surface via the annulus defined around drill string 112, and into a retention pit 124. The drilling fluid cools the drill hit 118 during operation and transports cuttings from the wellbore 104 into the retention pit 124.

The drilling system 100 may further include a bottom hole assembly (BHA) coupled to the drill string 112 near the drill bit 118. The BHA may comprise various downhole measurement tools such as, but not limited to, measurement-while-drilling (MWD) and logging-while-drilling (LWD) tools, which may be configured to take downhole measurements of drilling conditions. The MWD and LWD tools may include at least one wellbore logging tool 126, which may comprise one or more antennas axially spaced along the length of the wellbore logging tool 126 and capable of receiving and/or transmitting electromagnetic (EM) signals. The wellbore logging tool 126 may further comprise a plurality of ferrites used to shield the EM signals and thereby increase azimuthal sensitivity of the wellbore logging tool 126.

As the drill bit 118 extends the wellbore 104 through the formations 106, the wellbore logging tool 126 may continuously or intermittently collect azimuthally-sensitive measurements relating to the resistivity of the formations 106, how strongly the formations 106 opposes a flow of electric current. The wellbore logging tool 126 and other sensors of the MWD and LWD tools may be communicably coupled to a telemetry module 128 used to transfer measurements and signals from the BHA to a surface receiver (not shown) and/or to receive commands from the surface receiver. The telemetry module 128 may encompass any known means of downhole communication including, but not limited to, a mud pulse telemetry system, an acoustic telemetry system, a wired communications system, a wireless communications system, or any combination thereof. In certain embodiments, some or all of the measurements taken at the wellbore logging tool 126 may also be stored within the wellbore logging tool 126 or the telemetry module 128 for later retrieval at the surface upon retracting the drill string 112.

Figure 2:
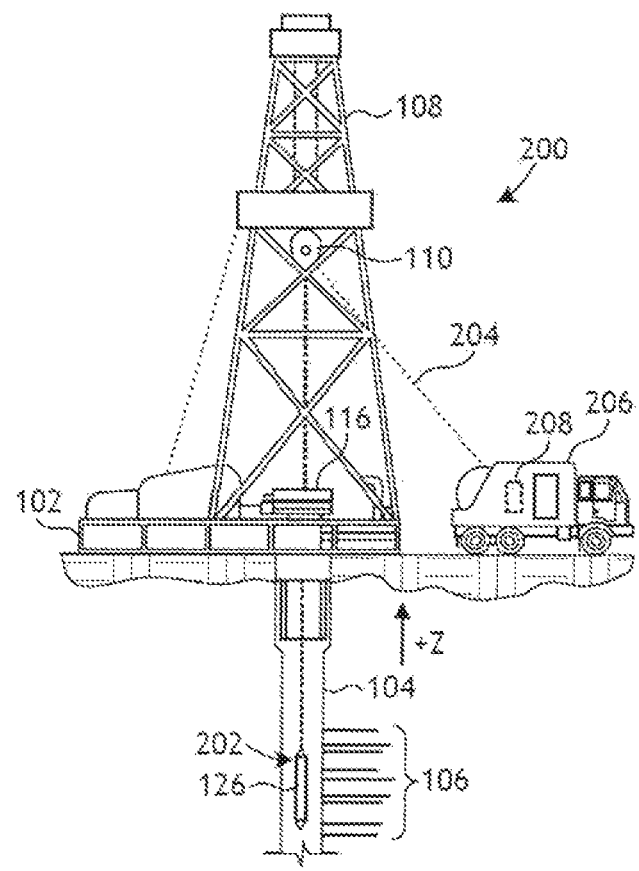
FIG. 2 is a schematic diagram of an example wireline system that may employ principles of the present disclosure.

At various times during the drilling process, the drill string 112 may be removed from the wellbore 104, as shown in FIG. 2, to conduct measurement/logging operations. More particularly, FIG. 2 depicts a schematic diagram of an example wireline system 200 that may employ the principles of the present disclosure, according to one or more embodiments. Like numerals used in FIGS. 1 and 2 refer to the same components or elements and, therefore, may not be described again. As illustrated, the wireline system 200 may include a wireline instrument sonde 202 that may be suspended into the wellbore 104 by a cable 204. The wireline instrument sonde 202 may include the wellbore logging tool 126 described above, which may be communicably coupled to the cable 204. The cable 204 includes conductors for transporting power to the wireline instrument sonde 202 and also facilitates communication between the surface and the wireline instrument sonde 202. A logging facility 206, shown in FIG. 2 as a truck, may collect measurements from the wellbore logging tool 126, and may include computing and data acquisition systems 208 for controlling, processing, storing, and/or visualizing the measurements gathered by the wellbore logging tool 126. The computing and data acquisition systems 208 may be communicably coupled to the wellbore logging tool 126 by way of the cable 204.

Figure 3A:
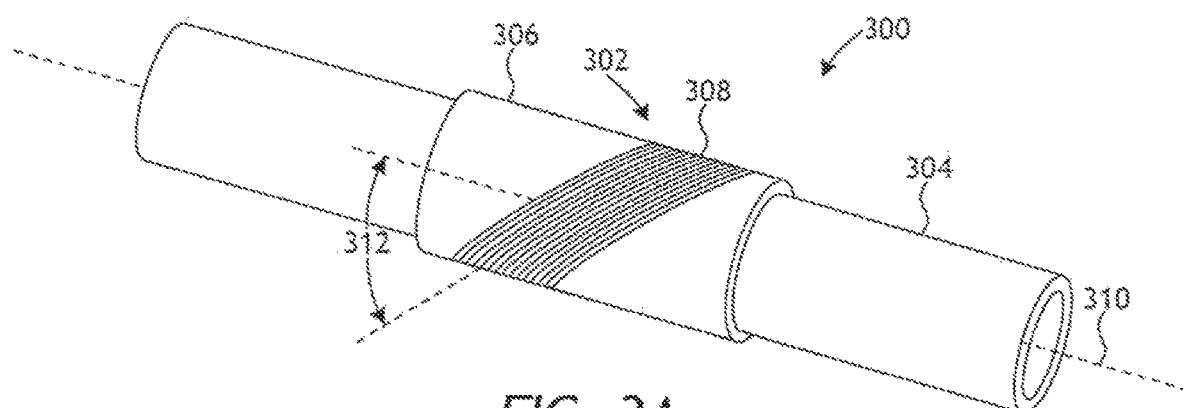
FIGS. 3A and 3B are views of an example antenna assembly.

FIG. 3A is a partial isometric view of an example wellbore logging tool 300, according to one or more embodiments. The logging tool 300 may be the same as or similar to the wellbore logging tool 126 of FIGS. 1 and 2 and, therefore, may be used in the drilling or wireline systems 100, 200 depicted therein. The wellbore logging tool 300 is depicted as including an antenna assembly 302 that can be positioned about a tool mandrel 304, such as a drill collar or the like. The antenna assembly 302 includes a bobbin 306 and a coil 308 wrapped about the bobbin 306 and extending axially by virtue of winding along at least a portion of the outer surface of the bobbin 306.

The bobbin 306 may structurally comprise a high temperature plastic, a thermoplastic, a polymer (e.g., polyimide), a ceramic, or an epoxy material, but could alternatively be made of a variety of other non-magnetic, electrically insulating/non-conductive materials. The bobbin 306 can be fabricated, for example, by additive manufacturing (i.e., 3D printing), molding, injection molding, machining, or other known manufacturing processes.

The coil 308 can include any number of consecutive "turns" (i.e. windings of wire) about the bobbin 306, but typically will include at least a plurality (i.e. two or more) consecutive full turns, with each full turn extending 360° about the bobbin 306. In some embodiments, a pathway or guide for receiving the coil 308 may be formed along the outer surface of the bobbin 306. For example, and as will be described in more detail below, one or more channels may be defined in the outer surface of the bobbin 306 to receive and seat the windings of the coil 308.

The coil 308 can be concentric or eccentric relative to a central axis 310 of the tool mandrel 304. As illustrated, the turns or windings of the coil 308 extend about the bobbin 306 at a winding angle 312 offset from the central axis 310. As a result, the antenna assembly 302 may be characterized and otherwise referred to as a "tilted coil" or "directional" antenna, and the bobbin 306 may be referred to as a tilted antenna bobbin. In the illustrated embodiment, the winding angle 312 is 45°, by way of example, but could alternatively be any angle offset from the central axis 310 (i.e., horizontal), without departing from the scope of the disclosure.

Figure 3B:
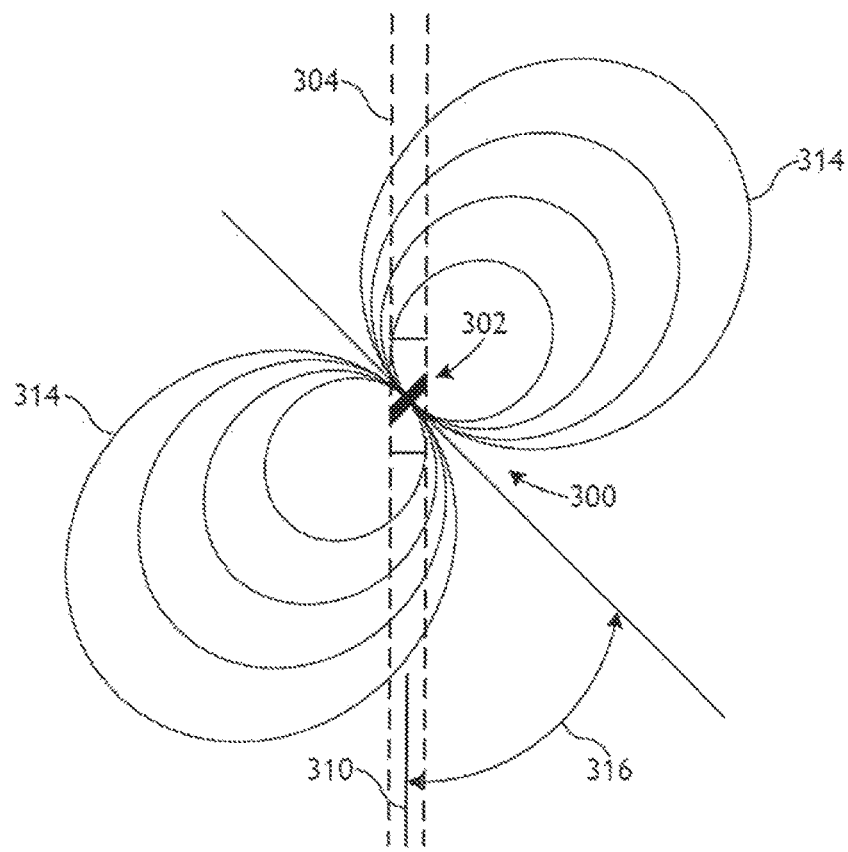

FIG. 3B is a schematic side view of the wellbore logging tool 300 of FIG. 3A. When current is passed through the coil 308 (FIG. 3A) of the antenna assembly 302, a dipole magnetic field 314 may be generated that extends radially outward from the antenna assembly 302 and orthogonal to the winding direction of the coil 308. As a result, the antenna assembly 302 may exhibit a magnetic field angle 316 with respect to the tool mandrel 304 and, since the winding angle 312 (FIG. 3A) is 45°, the resulting magnetic field angle 316 will also be 45° offset from the central axis 310. As will be appreciated, however, the magnetic field angle 316 may be varied by adjusting or manipulating the winding angle 312.

It should be noted, however, that while the antenna assembly 302 is shown and characterized as a "tilted" coil antenna, the principles of the present disclosure are equally applicable to antenna assemblies having a multi-turn coaxial coil loop antenna, where the coil 308 is generally orthogonal to the central axis 310.

Figure 4A:
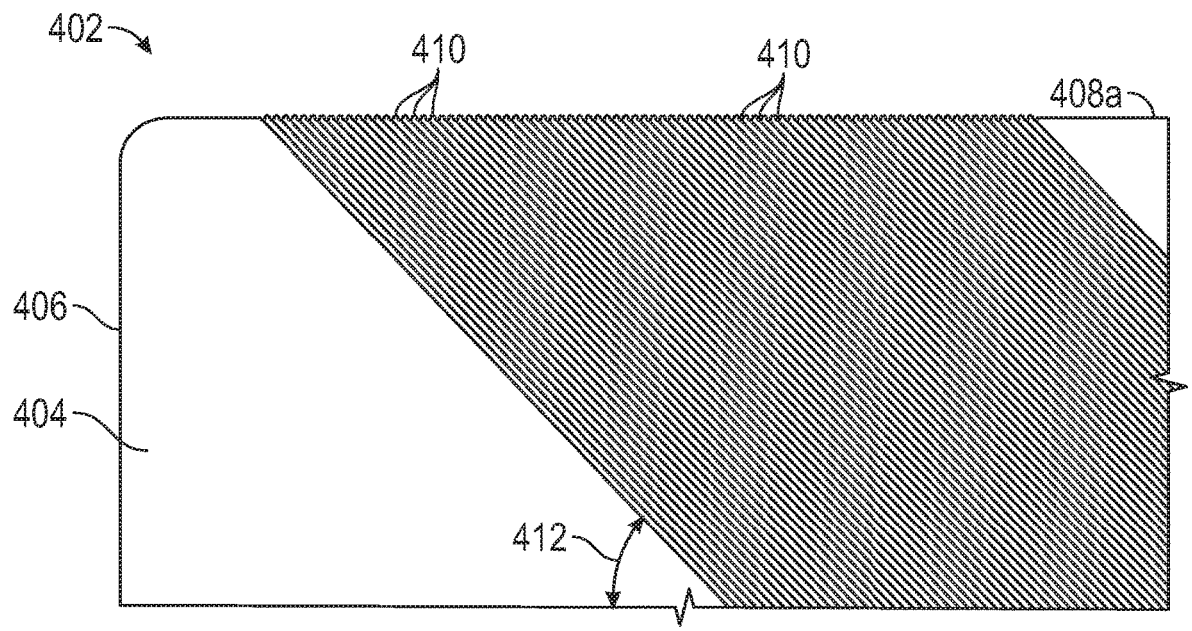
FIG. 4A is a partial side view of an example bobbin.
Figure 4B:
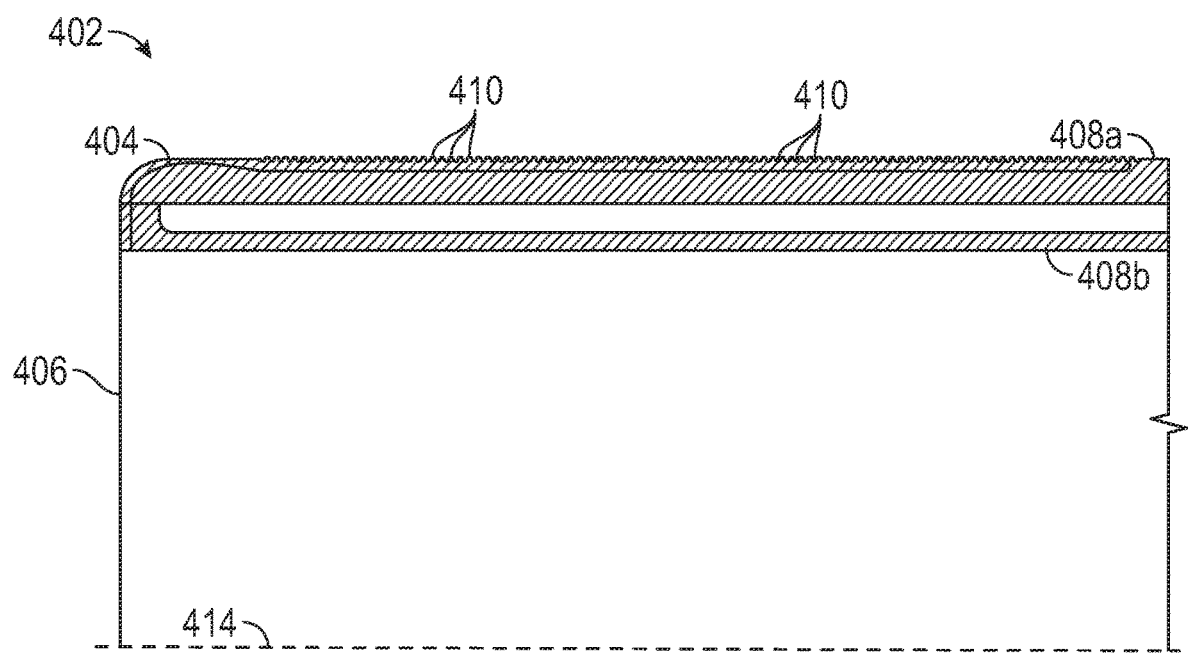
FIG. 4B is a partial cross-sectional side view of the bobbin of FIG. 4A.

FIG. 4A is a partial side view of an example bobbin 402, according to one or more embodiments, and FIG. 4B is a partial cross-sectional view of the bobbin 402. The bobbin 402 may be the same as or similar to the bobbin 306 of FIGS. 3A-3B and, therefore, may be used in the antenna assembly 302 as part of the logging tool 300. Similar to the bobbin 306, for example, the bobbin 402 may structurally comprise a high temperature plastic, a thermoplastic, a polymer (e.g., polyimide), a ceramic, or an epoxy material, but could alternatively be made of a variety of other non-magnetic, electrically insulating/non-conductive materials. Moreover, the bobbin 402 may be fabricated, for example, by additive manufacturing (i.e., 3D printing), molding, injection molding, machining, milling, or other known manufacturing processes.

The bobbin 402 may comprise a generally cylindrical body 404 that provides a first axial end 406, a second axial end (not shown) opposite the first axial end, an outer radial surface 408a, and an inner radial surface 408h (FIG. 49). In some embodiments, the body 404 may comprise two or more arcuate sections or parts that may be cooperatively assembled or coupled to form the bobbin 402. In other embodiments, however, the body 404 may comprise a monolithic, sleeve-like structure.

As illustrated, one or more channels 410 are defined on the outer radial surface 408a of the body 404 and extend radially a short distance into the body 404 and toward the inner radial surface 408b. In some embodiments, the channels 410 may form a plurality of independent annular grooves defined in the outer radial surface 408a and axially offset from each other. In other embodiments, however, the channels 410 may comprise a single helical annular groove that continuously winds about the circumference of the bobbin 402 axially along the outer radial surface 408a. Each channel 410 may be configured to receive and seat a wire to form a coil, such as the coil 308 of FIG. 3A.

As shown in FIG. 4A, the channels 410 may be defined in the outer radial surface 408a of the body 404 and extend about the circumference of the bobbin 402 at a winding angle 412 with respect to a central axis 414 (FIG. 4B). The winding angle 412 may be any angle ranging between perpendicular and parallel to the central axis 414 and, as a result, the bobbin 402 may be referred to as a tilted antenna bobbin. By way of example, as illustrated, the winding angle 412 may be 45° offset from the central axis 414 with reference to the first end 406 and, therefore, 135° offset from the central axis 414 with reference to the second end. In other embodiments, however, the winding angle 412 may alternatively be 45° offset from the central axis 414 with reference to the second end and, therefore, 135° offset from the central axis 414 with reference to the first end 406, without departing from the scope of the disclosure. In yet other embodiments, the winding angle 412 may be orthogonal to the central axis 414 and, as a result, the bobbin 402 may be referred to as a coaxial antenna bobbin. Accordingly, depending on the configuration of the channels 410, the resulting coil formed by the wire seated within the channels 410 may be concentric or eccentric relative to the central axis 414 of the bobbin 402.

Figure 5:
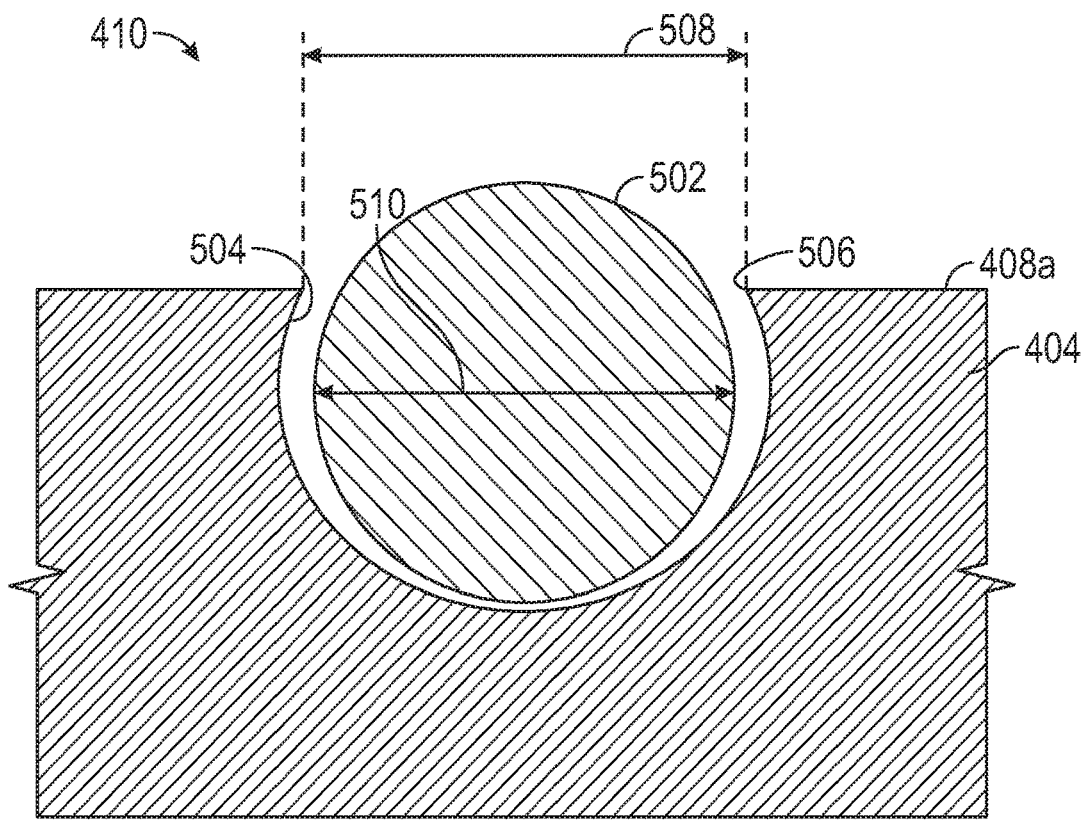
FIG. 5 is an enlarged cross-sectional side view of an example channel of the bobbin of FIGS. 4A-4B with a wire received therein.

FIG. 5 is an enlarged cross-sectional side view of an example channel 410 of the bobbin 402 of FIGS. 4A-4B with a wire 502 received therein. As illustrated, the channel 410 is defined in the body 404 of the bobbin 402 and exhibits a generally circular cross-section. More specifically, the channel 410 is defined by a continuously curved (arcuate) inner surface 504 having a constant radius. Moreover, the inner surface 504 of the channel 410 extends more than 180° but less than 360° and thereby defines an opening 506 in the body 404 sized to receive the wire 502.

The opening 506 exhibits a width 508 that is greater than or equal to the diameter 510 of the wire 502 and, therefore, the opening 506 is able to receive the wire 502 into the channel 410. When received and seated within the channel 410, an arcuate portion of the wire 502 extends through the opening 506 such that a portion of the wire 502 protrudes radially out of the channel 410 and away from the outer radial surface 408a of the body 404. Moreover, when the wire 502 is received and seated within the channel 410, the inner surface 504 encircles more than 180° but less than 360° of the circumference of the wire 502.

Figure 6:
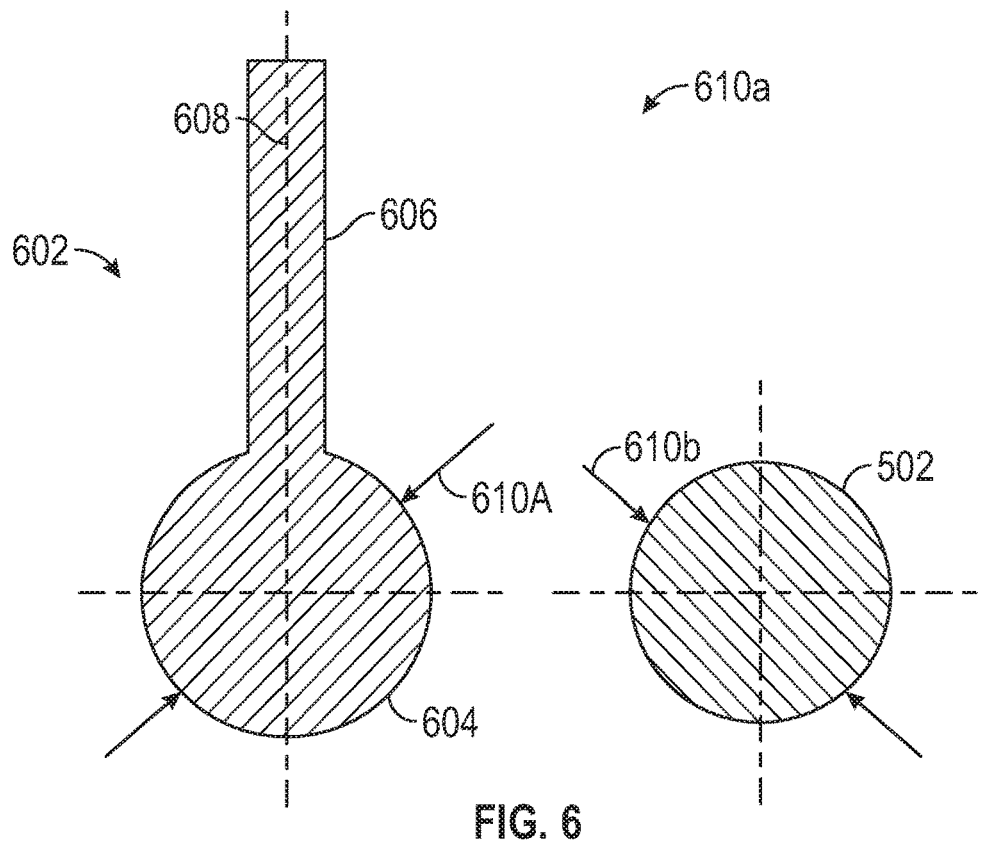
FIG. 6 is a cross-sectional side view of an example channel mill alongside a cross-sectional side view of the wire of FIG. 5.

FIG. 6 is a cross-sectional view of an example channel mill 602 alongside a cross-sectional side view of the wire 502 of FIG. 5. In some embodiments, the channel(s) 410 (FIG. 5) defined in the bobbin 402 (FIGS. 4A-4B) may be milled or otherwise formed using the channel mill 602. The channel mill 602 may comprise any cutting or milling tool capable of forming the channel(s). In at least one embodiment, for example, the channel mill 602 may comprise a ball mill or the like. In such embodiments, the channel mill 602 may include a spherical mill head 604 and a shank 606 coupled to and extending from the mill head 604. The shank 606 may be configured to be coupled to a milling machine or device used to rotate the mill head 604 about a central axis 608, and the mill head 604 may provide and otherwise define a plurality of teeth or blades used to cut through a substrate, such as the body 404 of the bobbin 402.

The mill head 604 exhibits a first diameter 610a and the wire 502 exhibits a second diameter 610b, where the first diameter 610a is slightly larger than the second diameter 610b. Consequently, the diameter of the resulting channel(s) 410 (FIG. 5) formed by the mill head 604 during fabrication will also be slightly larger than the second diameter 610b, which allows the wire 502 to be received within the channel(s) 410.

In forming the channel(s) 410, the channel mill 602 will engage the body 404 so that a continuously curved (arcuate) inner surface 504 (FIG. 5) having a constant radius of more than 180" but less than 360° is formed with an opening 506 (FIG. 5) to receive and seat the wire 502 (FIG. 5). In embodiments where the channel mill 602 is a ball mill, as illustrated, only about 60% of the mill head 604 may be used to form a given channel 410 (FIG. 5). In other words, the mill head 604 may mill (cut) into the body 404 of the bobbin 402 such that around 60% of the structure of the mill head 604 is used to mill through the body 404, while the remaining 40% of the mill head 604 does not engage the body 404. This results in the formation of the opening 506 (FIG. 5) to the channel(s) 410 and allows the inner surface 504 of the channel(s) 410 to extend more than 180° but less than 360° to receive and seat the wire 502.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about h." or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces, if there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. An antenna assembly, comprising:
   a bobbin secured to an outer surface of a tool mandrel, the bobbin having a cylindrical body defining an outer radial surface, an inner radial surface, and a central axis;
   one or more channels defined in the outer radial surface, wherein each channel is defined by a continuously curved inner surface having a constant radius, and wherein the continuously curved inner surface extends more than 180° but less than 360° and thereby defines an opening in the cylindrical body; and
   a coil including a wire wrapped about the bobbin and received within the one or more channels, wherein an arcuate portion of the wire extends through the opening such that a portion of the wire protrudes out of the channel.

2. The antenna assembly of claim 1, wherein the opening exhibits a width that is greater than or equal to a diameter of the wire.

3. The antenna assembly of claim 1, wherein the continuously curved inner surface encircles more than 180° but less than 360° of a circumference of the wire.

4. The antenna assembly of claim 1, wherein the one or more channels comprise a plurality of independent annular grooves defined in the outer radial surface and axially offset from each other.

5. The antenna assembly of claim 1, wherein the one or more channels comprise a single helical annular groove that continuously winds about a circumference of the bobbin.

6. The antenna assembly of claim 1, wherein the one or more channels extend about a circumference of the bobbin at a winding angle with respect to the central axis, and wherein the winding angle ranges between perpendicular and parallel to the central axis.

7. The antenna assembly of claim 6, wherein the winding angle is 45° offset from the central axis.

8. A method, comprising:
   introducing a wellbore logging tool into a wellbore, the wellbore logging tool including a tool mandrel and a bobbin secured to an outer surface of the tool mandrel, wherein the bobbin includes:
      a cylindrical body defining an outer radial surface, an inner radial surface, and a central axis;
      one or more channels defined in the outer radial surface, wherein each channel is defined by a continuously curved inner surface having a constant radius, and wherein the continuously curved inner surface extends more than 180° but less than 360° and thereby defines an opening in the cylindrical body; and
      a coil including a wire wrapped about the bobbin and received within the one or more channels, wherein an arcuate portion of the wire extends through the opening such that a portion of the wire protrudes out of the channel; and
   obtaining measurements of a surrounding subterranean formation with the wellbore logging tool.

9. The method of claim 8, wherein the tool mandrel is operatively coupled to a drill string and introducing the wellbore logging tool into the wellbore further comprises:
   extending the wellbore logging tool into the wellbore on the drill string; and
   drilling a portion of the wellbore with a drill bit secured to a distal end of the drill string.

10. The method of claim 8, wherein introducing the wellbore logging tool into the wellbore further comprises extending the wellbore logging tool into the wellbore on wireline as part of a wireline instrument sonde.

11. The method of claim 8, wherein the opening exhibits a width that is greater than or equal to a diameter of the wire.

12. The method of claim 8, wherein the one or more channels comprise a plurality of independent annular grooves defined in the outer radial surface and axially offset from each other.

13. The method of claim 8, wherein the one or more channels comprise a single helical annular groove that continuously winds about a circumference of the bobbin.

14. The method of claim 8, wherein the one or more channels extend about a circumference of the bobbin at a winding angle with respect to the central axis, and wherein the winding angle ranges between perpendicular and parallel to the central axis.

15. The method of claim 14, wherein the winding angle is 45° offset from the central axis.

16. A system comprising:
   a logging tool comprising a tool mandrel and an antenna assembly, the antenna assembly comprising,
      a bobbin secured to an outer surface of the tool mandrel, the bobbin having a cylindrical body defining an outer radial surface, an inner radial surface, and a central axis;
      one or more channels defined in the outer radial surface, wherein each channel is defined by a continuously curved inner surface having a constant radius, and wherein the continuously curved inner surface extends more than 180° but less than 360° and thereby defines an opening in the cylindrical body; and
      a coil including a wire wrapped about the bobbin and received within the one or more channels, wherein an arcuate portion of the wire extends through the opening such that a portion of the wire protrudes out of the channel.

17. The system of claim 16, wherein the logging tool is part of a bottom hole assembly, the system comprising a drill string coupled to the bottom hole assembly, wherein the drill string comprises a drill bit.

18. The system of claim 16, wherein the opening exhibits a width that is greater than or equal to a diameter of the wire.

19. The system of claim 16, wherein the one or more channels comprise a plurality of independent annular grooves defined in the outer radial surface and axially offset from each other.

20. The system of claim 16, wherein the one or more channels comprise a single helical annular groove that continuously winds about a circumference of the bobbin, wherein the one or more channels extend about a circumference of the bobbin at a winding angle with respect to the central axis, and wherein the winding angle ranges between perpendicular and parallel to the central axis.

* * * * *

UNITED STATES PATENT AND TRADEMARK OFFICE
CERTIFICATE OF CORRECTION

PATENT NO. : 11,053,793 B2
APPLICATION NO. : 16/346065
DATED : July 6, 2021
INVENTOR(S) : Jesse K. Hensarling et al.

Page 1 of 1

It is certified that error appears in the above-identified patent and that said Letters Patent is hereby corrected as shown below:

In the Specification

Column 3, beginning in Line 17, the word -acquistion- should read --acquisition--

Signed and Sealed this
Thirty-first Day of August, 2021

Drew Hirshfeld
*Performing the Functions and Duties of the*
*Under Secretary of Commerce for Intellectual Property and*
*Director of the United States Patent and Trademark Office*